(12) United States Patent
Marr et al.

(10) Patent No.: US 6,775,730 B2
(45) Date of Patent: Aug. 10, 2004

(54) SYSTEM AND METHOD FOR IMPLEMENTING A FLEXIBLE INTERRUPT MECHANISM

(75) Inventors: Delmar Marr, San Jose, CA (US); Harry Chue, Alameda, CA (US); Teiichi Shiga, Narashino (JP); James A. Chee, San Ramon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 639 days.

(21) Appl. No.: 09/838,102

(22) Filed: Apr. 18, 2001

(65) Prior Publication Data

US 2002/0194409 A1 Dec. 19, 2002

(51) Int. Cl.[7] .......................... G06F 13/24; G06F 13/00
(52) U.S. Cl. .................. 710/266; 710/10; 710/104; 713/1; 713/100
(58) Field of Search .................. 710/260–269, 710/8–19, 104, 46–50; 713/1, 2, 100

(56) References Cited

U.S. PATENT DOCUMENTS

| | | | |
|---|---|---|---|
| 5,101,497 A | | 3/1992 | Culley et al. ............. 395/725 |
| 5,261,107 A | | 11/1993 | Klim et al. ............. 395/725 |
| 5,263,148 A | * | 11/1993 | Jones et al. ................ 713/1 |
| 5,283,904 A | | 2/1994 | Carson et al. ............. 395/725 |
| 5,353,432 A | | 10/1994 | Richek et al. ............. 395/500 |
| 5,450,570 A | * | 9/1995 | Richek et al. ............. 710/10 |
| 5,535,420 A | | 7/1996 | Kardach et al. ............. 395/868 |
| 5,555,413 A | | 9/1996 | Luhman et al. ............. 395/733 |
| 5,613,128 A | | 3/1997 | Nizar et al. ............. 395/739 |
| 5,848,277 A | * | 12/1998 | Javernick et al. ............. 710/260 |
| 5,862,389 A | * | 1/1999 | Kardach et al. ............. 710/266 |
| 5,913,045 A | | 6/1999 | Gillespie et al. ............. 395/309 |
| 5,933,648 A | * | 8/1999 | Landolf et al. ............. 710/240 |
| 5,943,507 A | | 8/1999 | Cornish et al. ............. 395/868 |
| 6,021,458 A | * | 2/2000 | Jayakumar et al. ......... 710/266 |
| 6,141,703 A | * | 10/2000 | Ding et al. ............. 710/10 |
| 6,148,361 A | * | 11/2000 | Carpenter et al. ......... 710/260 |
| 6,636,916 B1 | * | 10/2003 | Campbell et al. ......... 710/266 |

* cited by examiner

*Primary Examiner*—Sumati Lefkowitz
(74) *Attorney, Agent, or Firm*—Gregory J. Koerner; Simon & Koerner LLP

(57) ABSTRACT

A system and method for implementing a flexible interrupt mechanism in an electronic system includes a processor that may initially execute an initialization routine for performing an interrupt configuration procedure. The foregoing interrupt configuration procedure may preferably be initiated when the processor programs a configuration register with certain selectable interrupt parameters that may be utilized to flexibly configure an interrupt module in the electronic system. Internal and external interrupt sources may then subsequently provide various interrupts to the configured interrupt module which may responsively detect and route the interrupts to the processor based upon interrupt information provided during the foregoing interrupt configuration procedure. The processor may then effectively service the interrupts during appropriate interrupt servicing procedures by utilizing corresponding interrupt handler routines.

63 Claims, 12 Drawing Sheets

SYSTEM AND METHOD FOR IMPLEMENTING A FLEXIBLE INTERRUPT MECHANISM

BACKGROUND SECTION

1. Field of the Invention

This invention relates generally to techniques for managing electronic systems, and relates more particularly to a system and method for implementing a flexible interrupt mechanism.

2. Description of the Background Art

Implementing flexible methods for managing electronic systems is a significant consideration for designers and manufacturers of contemporary electronic devices. However, effectively managing electronic systems may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced system operations may provide additional benefits to a system user, but may also place increased demands on the control and management of various device components. For example, an enhanced electronic device that processes digital image data may benefit from an effective implementation because of the large amount and complexity of the digital data involved. In addition, in certain contemporary environments, the occurrence of various internal and external events may sometimes require one or more interruptions of current systems processes in order to perform other system tasks.

Due to growing demands on system performance and substantially increasing data magnitudes, it is apparent that developing new techniques for managing electronic systems is a matter of concern for related electronic technologies. Therefore, for all the foregoing reasons, developing flexible techniques for managing electronic systems remains a significant consideration for designers, manufacturers, and users of contemporary electronic devices.

SUMMARY

In accordance with the present invention, an apparatus and method are disclosed for effectively implementing a flexible interrupt mechanism in an electronic system. In one embodiment, initially, a central processing unit (CPU) or another appropriate entity may preferably initiate an interrupt configuration procedure by programming an interrupt source field of a configuration register to thereby identify a particular interrupt source from a plurality of internal and external interrupt sources in the electronic system.

Next, the CPU or another appropriate entity may preferably program a trigger-type field of the configuration register to select a particular trigger type for the foregoing interrupt source of the electronic system. The trigger type may preferably include, but is not limited to, a low-level trigger, a high-level trigger, a negative-edge trigger, or a positive-edge trigger. An interrupt module or another appropriate entity may then preferably copy the trigger-type field from the configuration register into a corresponding location in internal or external trigger-type registers that correspond to respective internal or external interrupt sources in the electronic system.

The CPU or another appropriate entity may also preferably program a CPU-line field in the configuration register to select a particular CPU line for providing the interrupt from the corresponding interrupt source to the CPU. The interrupt module or another appropriate entity may then preferably copy the CPU-line field from the configuration register into a corresponding location in internal or external CPU-line registers that correspond to respective internal or external interrupt sources in the electronic system.

The foregoing interrupt configuration process may preferably repeat until all interrupts for all interrupt sources in the electronic system have been configured. In addition, certain of the foregoing steps may readily be performed in a concurrent manner. The CPU may then preferably install all appropriate interrupt handlers that correspond to the interrupt sources of the electronic system for servicing interrupts from the interrupt sources.

Subsequently, a particular interrupt source in the electronic system may preferably transmit an interrupt to an interrupt module of a bridge device in the electronic system. A trigger module of the interrupt module may preferably detect the interrupt transmitted from the interrupt source by utilizing a trigger type designated in the foregoing trigger-type registers.

Next, an interrupt controller of the interrupt module may preferably program a status register to thereby indicate detecting the interrupt from the interrupt source. The interrupt module may then preferably determine whether the electronic system has been enabled for servicing the particular interrupt received from the interrupt source. In certain embodiments, the interrupt module may preferably reference an enable register to determine whether the interrupt has been enabled. If the interrupt from the interrupt source has been enabled, then the interrupt module may preferably select an appropriate CPU line that may be designated in the foregoing CPU-line register. The interrupt controller may then preferably route the interrupt to the CPU over the designated CPU line.

The CPU may next preferably read an appropriate location in the status register to thereby identify the particular interrupt source corresponding to the received interrupt. Then, the CPU may preferably utilize an appropriate corresponding interrupt handler to service the interrupt from the interrupt source. Finally, the CPU may preferably clear the serviced interrupt using a clear register which may also reset the corresponding location in the status register to indicate that the interrupt has been successfully serviced. The present invention thus provides an improved system and method for implementing a flexible interrupt mechanism in an electronic system.

DETAILED DESCRIPTION

The present invention relates to an improvement in system management techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for implementing a flexible interrupt mechanism in an electronic system, and preferably includes a processor that may initially execute an initialization routine for performing an interrupt configuration procedure. The foregoing interrupt configuration procedure may preferably be initiated when the processor programs a configuration register with certain selectable interrupt parameters that may be utilized to flexibly configure an interrupt module in the electronic system. Internal and external interrupt sources may then subsequently provide various interrupts to the configured interrupt module which may responsively detect and route the interrupts to the processor based upon interrupt information provided during the foregoing interrupt configuration procedure. The processor may then effectively service the interrupts with during appropriate interrupt servicing procedures by utilizing corresponding interrupt handler routines.

Figure 1:
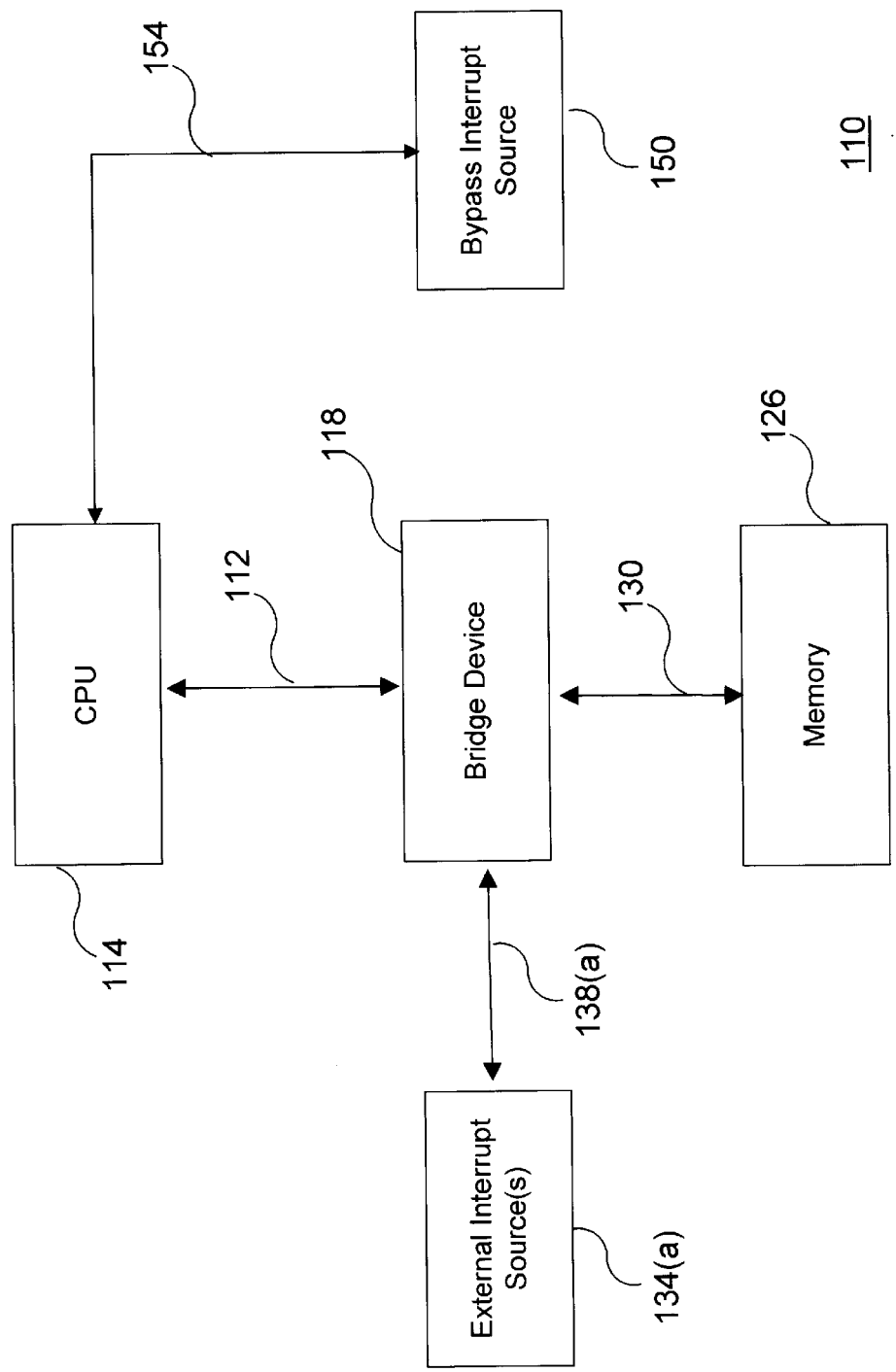
FIG. 1 is a block diagram for one embodiment of an electronic system, in accordance with the present invention.

Referring now to FIG. 1, a block diagram for one embodiment of an electronic system 110 is shown, in accordance with the present invention. In the FIG. 1 embodiment, electronic system 110 may preferably include, but is not limited to, a central processing unit (CPU) 114, a bridge device 118, a memory 126, one or more external interrupt sources 134(a), and a bypass interrupt source 150. In alternate embodiments, electronic system 110 may readily include various other elements or functionalities in addition to, or instead of, those elements or functionalities discussed in conjunction with the FIG. 1 embodiment.

Furthermore, electronic system 110 may be implemented and configured in any desired manner. For example, electronic system 110 may be implemented as one or more integrated circuit devices, as a audio/visual electronic system, as a consumer electronics device, as a portable electronic device, or as a computer system.

In the FIG. 1 embodiment, CPU 114 may preferably be implemented as any appropriate and effective processor device or microprocessor to thereby control and coordinate the operation of electronic system 110 in response to various software program instructions. In certain embodiments, CPU 114 may preferably be implemented as a MIPS microprocessor device. Bridge device 118 may communicate with CPU 114 via path 112, and may preferably include one or more internal interrupt sources. One embodiment of bridge device 118 is further discussed below in conjunction with FIG. 3.

In the FIG. 1 embodiment, memory 126 may bidirectionally communicate with other entities in electronic system 110 through bridge device 118 via path 130. Memory 126 may be implemented by utilizing any effective technologies or configurations. One implementation and configuration for memory 126 is further discussed below in conjunction with FIG. 2.

In accordance with the present invention, bridge device 118 may also bidirectionally communicate with various interrupt sources in electronic system 110. In the FIG. 1 embodiment, bridge device 118 may preferably communicate with one or more external interrupt sources 134(a) via path 138(a). In the FIG. 1 embodiment, external interrupt sources 134(a) may include any appropriate electronic entity, device, or system from outside of bridge device 118. In the FIG. 1 embodiment, a bypass interrupt source 150 may also communicate directly with CPU 114 via path 154.

Figure 2:
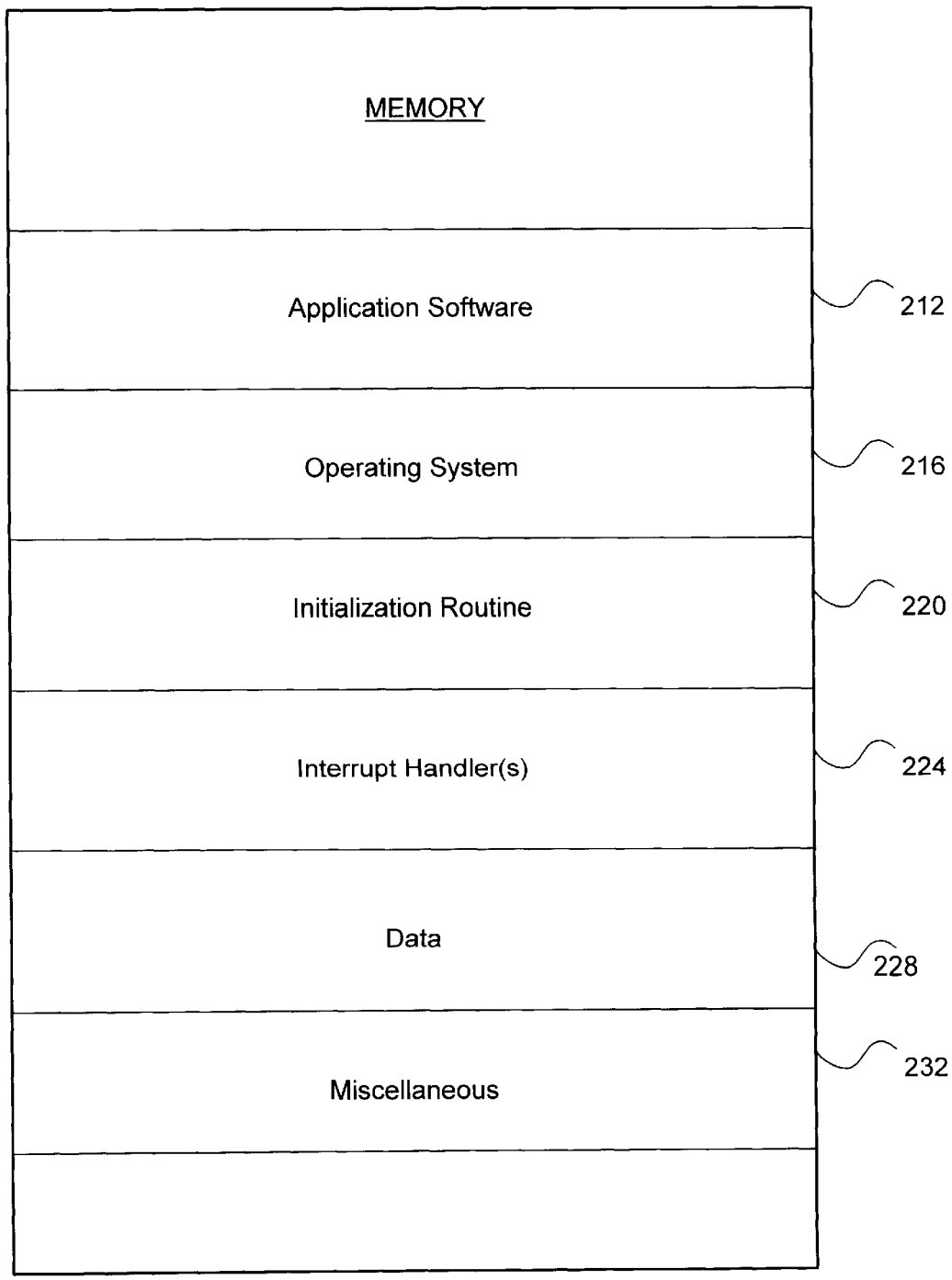
FIG. 2 is a block diagram for one embodiment of the memory of FIG. 1, in accordance with the present invention.

Referring now to FIG. 2, a block diagram for one embodiment of the FIG. 1 memory 126 is shown, in accordance with the present invention. In the FIG. 2 embodiment, memory 126 may preferably include, but is not limited to, application software 212, an operating system 216, an initialization routine 220, one or more interrupt handlers 224, data 228, and miscellaneous routines 232. In alternate embodiments, memory 126 may readily include various other components in addition to, or instead of, those components discussed in conjunction with the FIG. 2 embodiment.

In the FIG. 2 embodiment, application software 212 may include program instructions that are preferably executed by CPU 114 (FIG. 1) to perform various functions and operations for electronic system 110. The particular nature and functionality of application software 212 may preferably vary depending upon factors such as the type and particular use of the corresponding electronic system 110.

In the FIG. 2 embodiment, operating system 216 preferably controls and coordinates low-level functionality of electronic system 110. In accordance with the present invention, initialization routine 220 may preferably be executed by CPU 114 to perform an interrupt configuration procedure for electronic system 110. The operation and utilization of initialization routine 220 is further discussed below in conjunction with FIGS. 5 and 11.

Interrupt handler(s) 224 may include one or more interrupt service routines that each correspond to a different particular interrupt from a corresponding interrupt source 134. In the FIG. 2 embodiment, data 228 may preferably be implemented and configured to provide a location for storing any desired type of electronic data or other appropriate information. Miscellaneous routines 232 may include any desired additional software instructions to facilitate corresponding functions performed by electronic system 110.

Figure 3:
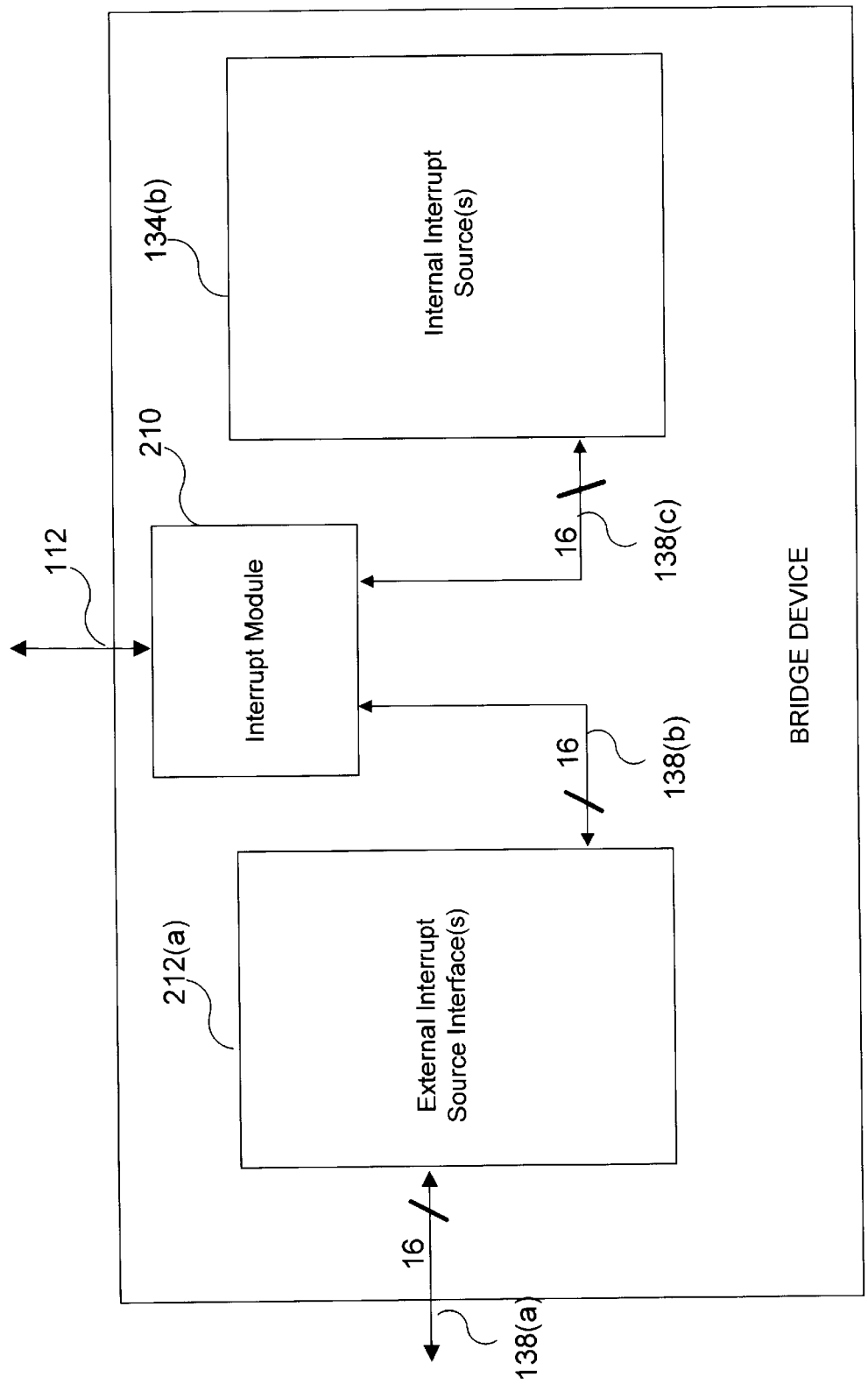
FIG. 3 is a block diagram for one embodiment of the bridge device of FIG. 1, in accordance with the present invention.

Referring now to FIG. 3, a block diagram for one embodiment of the FIG. 1 bridge device 118 is shown, in accordance with the present invention. In the FIG. 3 embodiment, bridge device 118 may preferably include, but is not limited to, an interrupt module 210, one or more external interrupt source interfaces 212(a), and one or more internal interrupt sources 134(b).

In alternate embodiments, bridge device 118 may readily include various other elements or functionalities in addition to, or instead of, those elements or functionalities discussed in conjunction with the FIG. 3 embodiment. For example, in certain embodiments, bridge device 118 may communicate with different configurations of interface sources than those discussed in conjunction with the FIG. 3 embodiment. In addition, bridge device 118 may be implemented in any appropriate manner. For example, in certain embodiments, bridge device 118 may be implemented as a separate integrated circuit device in electronic system 110.

In the FIG. 3 embodiment, sixteen external interrupt sources 134(a) (FIG. 1) may preferably provide separate interrupts to external interrupt source interfaces 212(a) via sixteen individual input paths 138(a). In response, external interrupt source interfaces 212(a) may preferably provide the separate interrupts from the external interrupt sources 134(a) to interrupt module 210 via sixteen individual input lines 138(b).

Similarly, in the FIG. 3 embodiment, sixteen internal interrupt sources 134(b) may preferably provide separate interrupts to interrupt module 210 via sixteen individual interrupt lines 138(c). In alternate embodiments, interrupt module 210 may readily receive a different number of interrupt lines 138 than those shown in the FIG. 3 embodiment. In the FIG. 3 embodiment, internal interrupt sources 134(b) may include any appropriate electronic entity, device, or system from within bridge device 118. For example, internal interrupt sources 134(b) may include a timer device, a serial port, a real-time clock, or a general-purpose input/output device.

In accordance with the present invention, interrupt module 210 may thus preferably receive various interrupts from external interrupt sources 134(a) and internal interrupt sources 134(b), and responsively perform a interrupt routing procedure to selectively provide interrupts to CPU 114 in a designated manner. The functionality and configuration of interrupt module 210 is further discussed below in conjunction with FIG. 3.

Figure 4:
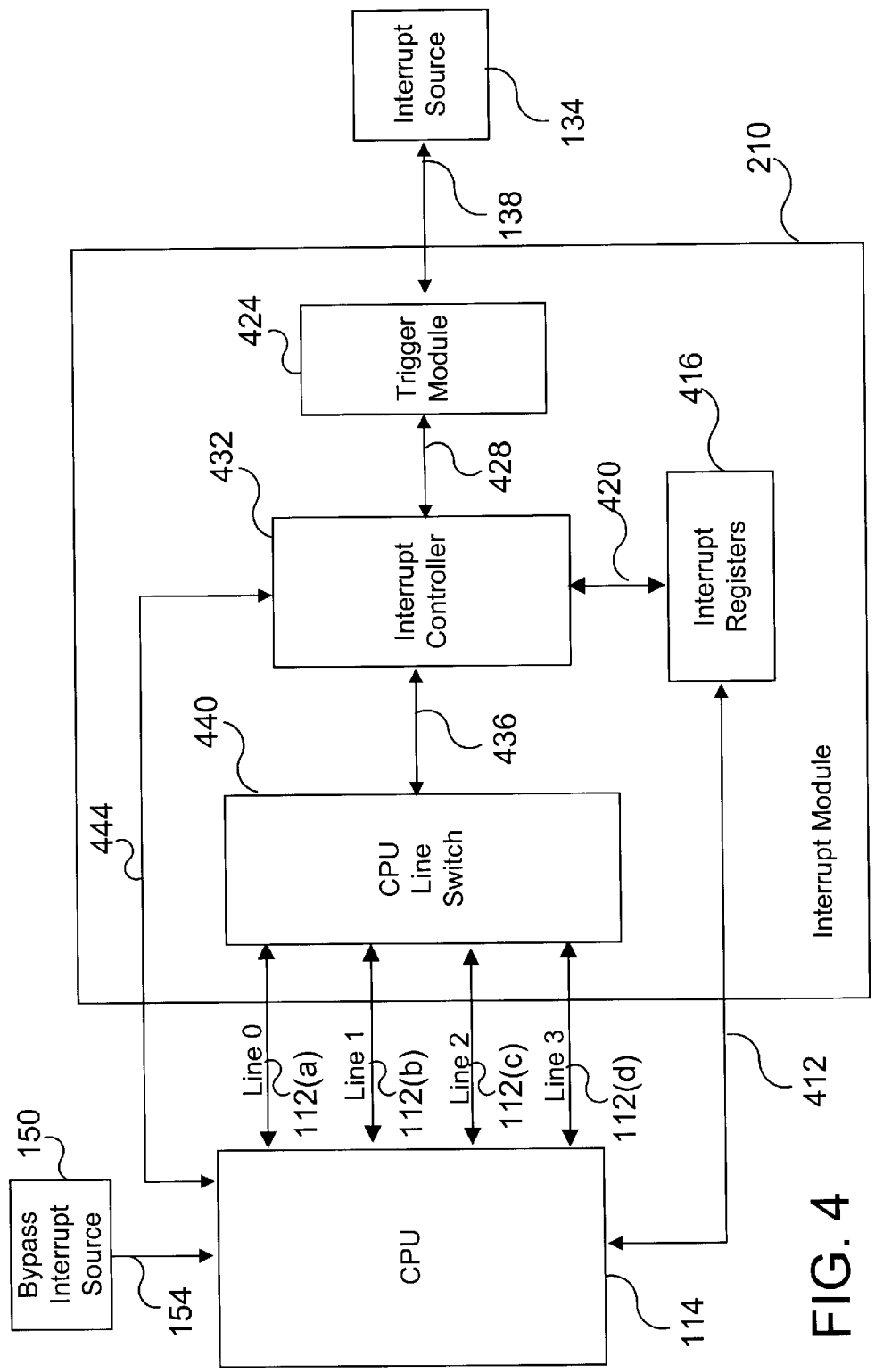
FIG. 4 is a block diagram for one embodiment of the interrupt module of FIG. 3, in accordance with the present invention.

Referring now to FIG. 4, a block diagram for one embodiment of the FIG. 3 interrupt module 210 is shown, in accordance with the present invention. In the FIG. 4 embodiment, interrupt module 210 may preferably include, but is not limited to, one or more interrupt registers 416, a trigger module 424, an interrupt controller 432, an a CPU-line switch 440. In alternate embodiments, interrupt module 210 may readily include various other elements or functionalities in addition to, or instead of, those elements or functionalities discussed in conjunction with the FIG. 4 embodiment.

For reasons of clarity, the FIG. 4 embodiment shows interrupt module 210 communicating with one generic interrupt source 134 via a single input line 138. However, as discussed above in conjunction with FIG. 3, interrupt module 210 may typically communicate with a plurality of different types of interrupt sources 134 via a corresponding plurality of individual input lines 138. In certain embodiments, interrupt module 210 may also include separate trigger modules 424, interrupt controllers 432, or CPU-line switches 440 for each interrupt source 134. Alternately, interrupt module 210 may be implemented to utilize one or more trigger modules 424, interrupt controllers 432, or CPU-line switches 440 that each receive and handle interrupts from multiple interrupt sources 134.

In the FIG. 4 embodiment, initially, CPU 114 may preferably program a configuration register in interrupt registers 416 to thereby configure interrupt module 210. Subsequently, an interrupt source 134 may preferably generate an interrupt to trigger module 424 of interrupt module 210 via input line 138. In accordance with the present invention, trigger module 424 may preferably be selectively configured to detect an interrupt from interrupt source 134 using any desired trigger type. For example, trigger module 424 may detect an interrupt signal from interrupt source 134 by sensing trigger types that may include, but are not limited to, a low-level trigger, a high-level trigger, a negative-edge trigger, or a positive-edge trigger that each preferably relates to a detected state of the interrupt signal on input line 138.

In accordance with the present invention, interrupt controller 432 may preferably reference trigger-type registers in interrupt registers 416 via path 420 to determine an appropriate trigger type for interrupt source 134. Interrupt controller 432 may then flexibly configure trigger module 424 via path 428 for detecting an appropriate trigger type for interrupt source 134. Similarly, interrupt controller 432 may preferably reference CPU-line registers in interrupt registers 416 via path 420 to determine an appropriate CPU-line 112 for providing the detected interrupt from interrupt module 210 to CPU 114. Interrupt controller 432 may then flexibly configure CPU-line switch 440 via path 436 to thereby provide an appropriate CPU line 112 from interrupt module 112 to CPU 114.

Interrupt controller 432 may also preferably reference an enable register in interrupt registers 416 via path 420 to determine whether the particular interrupt source 134 is currently in an enabled state. If the interrupt source 134 is currently enabled, then interrupt controller 432 may advantageously route the corresponding detected interrupt from trigger module 424 through CPU-line switch 440 onto a selected one of CPU line 0 (112(a)), CPU line 1 (112(b)), CPU line 2 (112(c)), or CPU line 3 (112(d)) to thereby transfer the interrupt from interrupt source 134 to CPU 114. CPU 114 may then execute an appropriate interrupt handler 224 (FIG. 2) to effectively service the particular interrupt from interrupt source 134.

In certain instances, a bypass interrupt source 150 may provide a bypass interrupt directly to CPU 114 via bypass path 154 to thereby avoid the interrupt mechanism of interrupt module 210. In the FIG. 4 embodiment, bypass interrupt source 150 may include any desired and suitable type of electronic entity. For example, bypass interrupt source may include a specialized electronic device or system that is designed to provide certain desired functionality for electronic system 110.

In accordance with the present invention, certain of interrupt registers 416 (and any other desired registers in electronic system 110) may preferably be programmed by an appropriate entity by utilizing a write-only mechanism that advantageously avoids having to perform a time-consuming and software-intensive conventional read-modify-write operation. In the FIG. 4 embodiment, interrupt registers 416 only affect the operation of interrupt module 210 when a given bit value corresponding to a particular interrupt source 134 is set to a binary one.

When utilizing the foregoing write-only mechanism, a binary zero in a particular bit position in one of interrupt registers 416 preferably has no effect on the operation of interrupt module 210. Therefore, the write-only mechanism may preferably affect only those bits that require to be changed to a binary one, and may disregard any bits that are equal to zero. The foregoing write-only mechanism thus reduces the need for electronic system 110 to read the contents of a particular interrupt register 416, determine which bits need to be modified, and then rewrite a new value back into the particular interrupt register 416. The operation and configuration of interrupt module 210 is further discussed below in conjunction with FIGS. 5 through 12.

Figure 5:
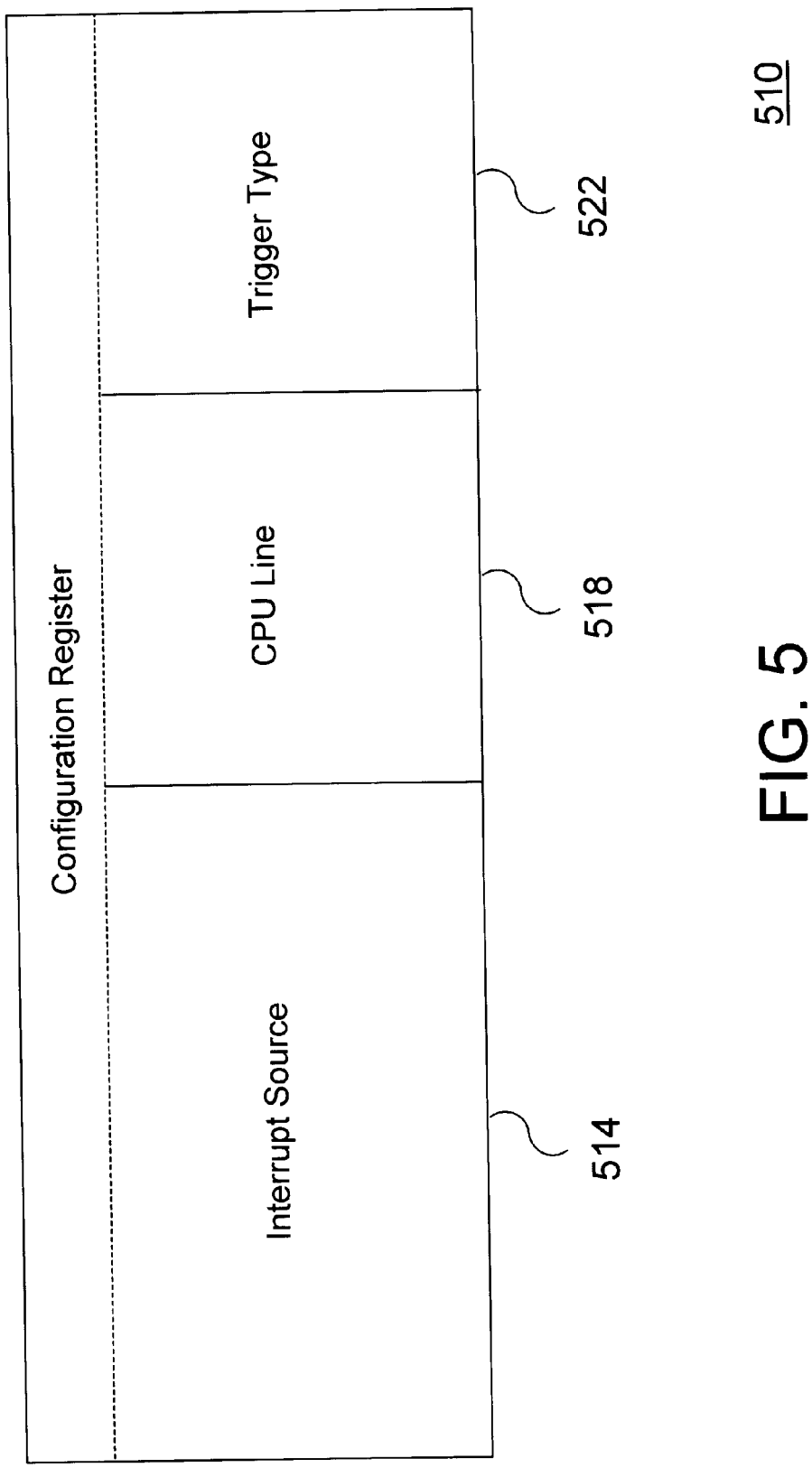
FIG. 5 is a block diagram for one embodiment of a configuration register, in accordance with the present invention.

Referring now to FIG. 5, a block diagram for one embodiment of a configuration register 510 is shown, in accordance with the present invention. In the FIG. 5 embodiment, configuration register 510 may preferably include an interrupt source field 514, a CPU-line field 518, and a trigger-type field 522. In alternate embodiments, configuration register 510 may readily include various other elements in addition to, or instead of, those elements discussed in conjunction with the FIG. 5 embodiment. In the FIG. 5 embodiment, configuration register 510 may be implemented as part of interrupt registers 416 of interrupt module 210, or may alternately be implemented in any other suitable manner that is electrically coupled to electronic system 110.

In the FIG. 5 embodiment, CPU 114, operating system 216, initialization routine 220, or any other appropriate entity may advantageously program configuration register 510 with various interrupt parameters to thereby flexibly alter the configuration of interrupt module 210 with respect to one or more interrupt sources 134. In accordance with the present invention, configuration register 510 may preferably be initially programmed at powerup as part of an initialization procedure of electronic system 110.

However, configuration register 510 may also be advantageously utilized to flexibly reconfigure interrupt module 210 at any time during the normal operation of electronic system 110. In certain embodiments, configuration register 510 may be implemented as a 32-bit register in which interrupt source field 514 utilizes bits eight through twelve, CPU-line field 518 utilizes bits four and five, and trigger-type field 522 utilizes bits zero and one.

In the FIG. 5 embodiment, interrupt source field 514 may preferably be programmed to identify a particular interrupt source 134 for configuring with respect to interrupt module 210. A given value in the interrupt source field 514 may also identify a register location in various interrupt registers 416 that corresponds to the foregoing interrupt source 134.

For example, in the FIG. 5 embodiment in which interrupt module 210 receives sixteen external interrupt sources 134(a) and sixteen internal interrupt sources 134(b) (see FIG. 3), a binary value zero (00000) in interrupt source field 514 may preferably indicate an internal interrupt source zero corresponding to bit position zero in a 32-bit interrupt register 416. Similarly, a binary value fifteen (01111) in interrupt source field 514 may preferably indicate an internal interrupt source fifteen corresponding to bit position fifteen in a 32-bit interrupt register 416.

In addition, a binary value sixteen (10000) in interrupt source field 514 may preferably indicate an external interrupt source zero corresponding to bit position sixteen in a 32-bit interrupt register 416. Also, a binary value thirty-one (11111) in interrupt source field 514 may preferably indicate an external interrupt source fifteen corresponding to bit position thirty-one in a 32-bit interrupt register 416.

The following table contains exemplary values for interrupt source field 514 along with corresponding register bit numbers for associated interrupt registers 416, internal interrupt sources 134(b), and external interrupt sources 134(a).

TABLE I

| Int. Source Field | Int. Source | Int. Register Bit |
|---|---|---|
| 00000 | Internal Int. Source 0 | 0 |
| 00001 | Internal Int. Source 1 | 1 |
| 00010 | Internal Int. Source 2 | 2 |
| 00011 | Internal Int. Source 3 | 3 |
| 00100 | Internal Int. Source 4 | 4 |
| 00101 | Internal Int. Source 5 | 5 |
| 00110 | Internal Int. Source 6 | 6 |
| 00111 | Internal Int. Source 7 | 7 |
| 01000 | Internal Int. Source 8 | 8 |
| 01001 | Internal Int. Source 9 | 9 |
| 01010 | Internal Int. Source 10 | 10 |
| 01011 | Internal Int. Source 11 | 11 |
| 01100 | Internal Int. Source 12 | 12 |
| 01101 | Internal Int. Source 13 | 13 |
| 01110 | Internal Int. Source 14 | 14 |
| 01111 | Internal Int. Source 15 | 15 |
| 10000 | External Int. Source 0 | 16 |
| 10001 | External Int. Source 1 | 17 |
| 10010 | External Int. Source 2 | 18 |
| 10011 | External Int. Source 3 | 19 |
| 10100 | External Int. Source 4 | 20 |
| 10101 | External Int. Source 5 | 21 |
| 10110 | External Int. Source 6 | 22 |
| 10111 | External Int. Source 7 | 23 |
| 11000 | External Int. Source 8 | 24 |
| 11001 | External Int. Source 9 | 25 |
| 11010 | External Int. Source 10 | 26 |
| 11011 | External Int. Source 11 | 27 |
| 11100 | External Int. Source 12 | 28 |
| 11101 | External Int. Source 13 | 29 |
| 11110 | External Int. Source 14 | 30 |
| 11111 | External Int. Source 15 | 31 |

Referring again to the FIG. 5 embodiment, CPU-line field 518 may preferably be programmed to select a particular CPU line 112 (FIG. 4) for routing an interrupt from interrupt module 210 to CPU 114. In the FIG. 5 embodiment, CPU-line field 518 may be implemented use two bits. The following table contains exemplary values for CPU-line field 518 along with corresponding selected CPU line 112.

TABLE II

| Bit One | Bit Zero | CPU Line |
|---|---|---|
| 0 | 0 | CPU Line 0 |
| 0 | 1 | CPU Line 1 |
| 1 | 0 | CPU Line 2 |
| 1 | 1 | CPU Line 3 |

Similarly, trigger-type field 522 may preferably be programmed to indicate a particular trigger type for detecting an interrupt from interrupt source 134, as discussed above in conjunction with FIG. 4. In the FIG. 5 embodiment, trigger-type field 522 may be implemented use two bits. Bit one may select level or edge triggering, while bit zero may select polarity (low-high/negative-positive) of the trigger. The following table contains exemplary values for trigger-type field 522 along with corresponding selected trigger types.

TABLE III

| Bit One | Bit Zero | Trigger Type |
|---|---|---|
| 0 | 0 | Low-Level Trigger |
| 0 | 1 | High-Level Trigger |
| 1 | 0 | Negative-Edge Trigger |
| 1 | 1 | Positive Edge Trigger |

In alternate embodiments, configuration register 510 may be implemented and configured in any other suitable manner. The programming and utilization of configuration register 510 is further discussed below in conjunction with FIG. 11.

Figure 6:
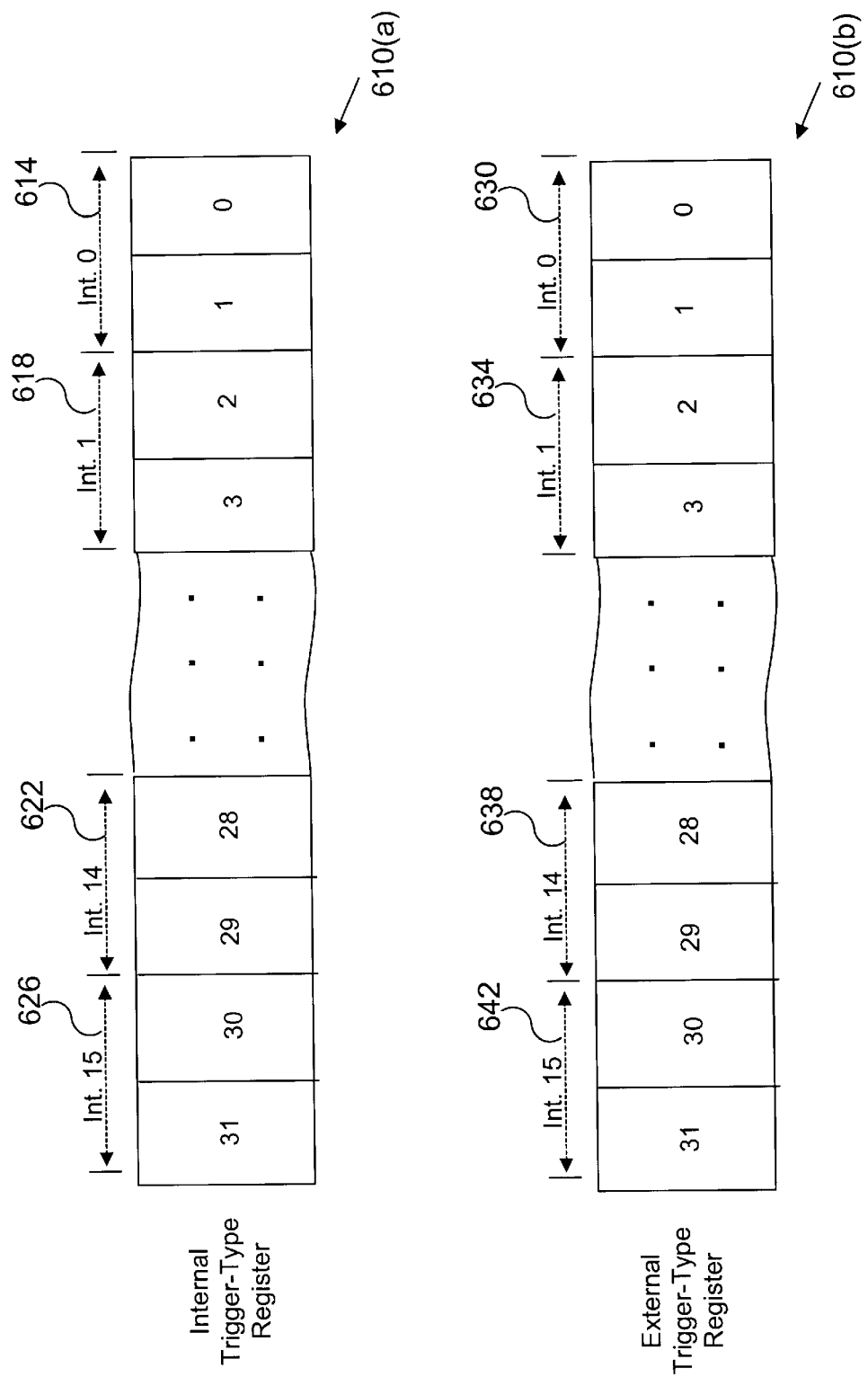
FIG. 6 is a block diagram for one embodiment of trigger-type registers, in accordance with the present invention.

Referring now to FIG. 6, a block diagram for one embodiment of trigger-type registers 610 is shown, in accordance with the present invention. The FIG. 6 embodiment includes an internal trigger-type register 610(*a*) and an external trigger-type register 610(*b*). In alternate embodiments, trigger-type registers 610 may readily include various other elements in addition to, or instead of, those elements discussed in conjunction with the FIG. 6 embodiment. In the FIG. 6 embodiment, trigger-type registers 610 may be implemented as part of interrupt registers 416 of interrupt module 210, or may alternately be implemented in any other suitable manner that is electrically coupled to electronic system 110.

In the FIG. 6 embodiment, internal trigger-type register 610(*a*) may preferably be implemented as a 32-bit register that stores a series of 2-bit fields that each correspond to a particular internal interrupt source 134(*b*). For example, in the FIG. 6 embodiment, bit zero and bit one of internal trigger-type register 610(*a*) preferably identify an interrupt zero trigger-type 614 for a corresponding internal interrupt source zero, while bit thirty and bit thirty-one of internal trigger-type register 610(*a*) preferably identify an interrupt trigger-type 626 for a corresponding internal interrupt source fifteen.

The two-bit fields of internal trigger-type register 610(*a*) may preferably correspond to trigger-type values initially obtained from trigger-type field 522 of configuration register 510 (FIG. 5) as shown in foregoing Table III. In the FIG. 6 embodiment, the foregoing two-bits fields may each be associated with a different internal interrupt source 134(*b*) through configuration register 510, as shown in foregoing Table I.

Similarly, in the FIG. 6 embodiment, external trigger-type register 610(*b*) may preferably be implemented as a 32-bit register that stores a series of 2-bit fields that each correspond to a particular external interrupt source 134(*a*). For example, in the FIG. 6 embodiment, bit zero and bit one of external trigger-type register 610(*b*) preferably identify an interrupt zero trigger-type 630 for a corresponding external interrupt source zero, while bit thirty and bit thirty-one of external trigger-type register 610(*b*) preferably identify an interrupt trigger-type 642 for a corresponding external interrupt source fifteen.

The two-bit fields of external trigger-type register 610(*b*) may preferably correspond to trigger-type values initially obtained from trigger-type field 522 of configuration register 510 (FIG. 5) as shown in foregoing Table III. In the FIG. 6 embodiment, the foregoing two-bits fields may each be associated with a different external interrupt source 134(*a*) through configuration register 510, as shown in foregoing Table I.

Figure 7:
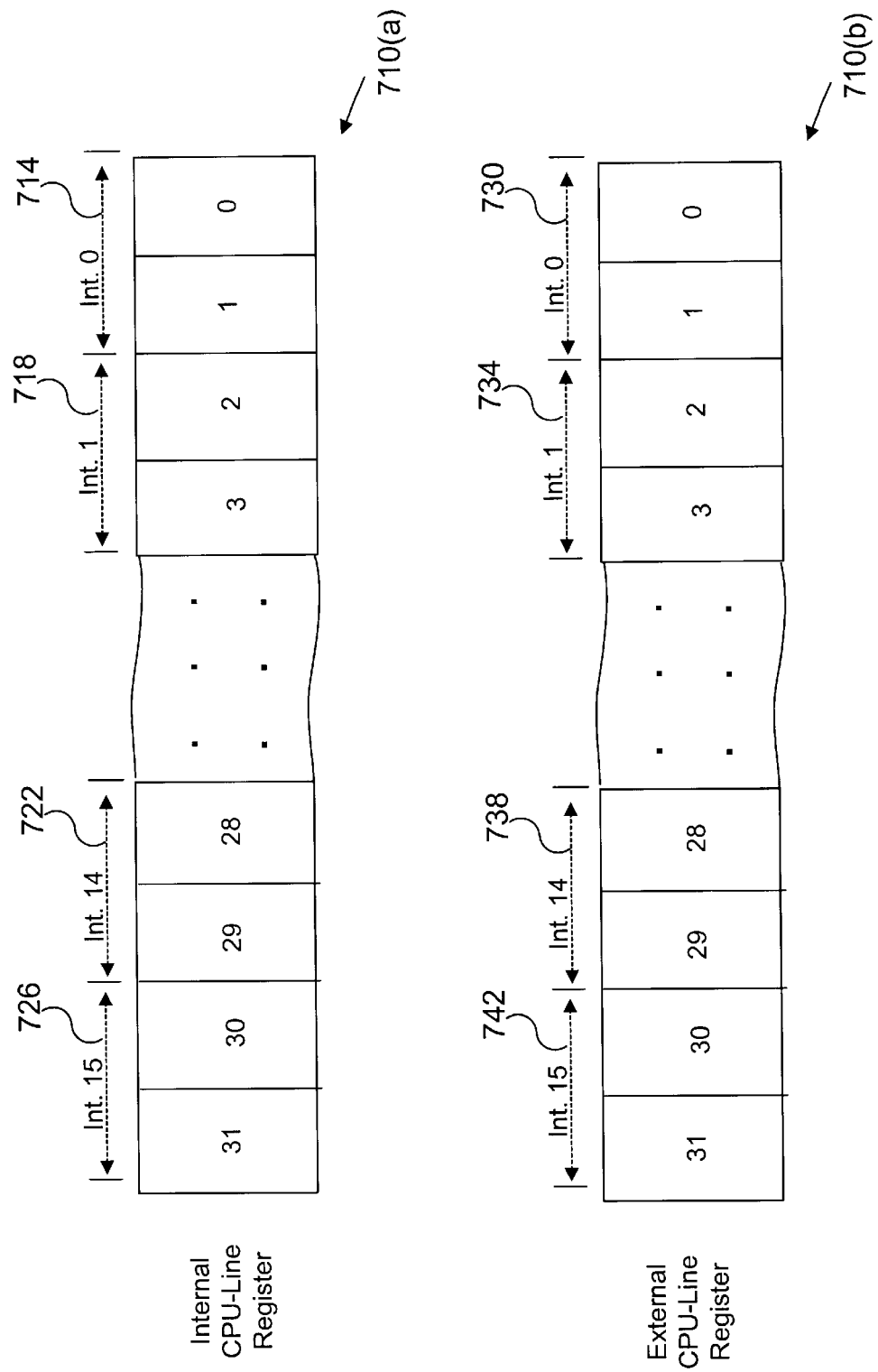
FIG. 7 is a block diagram for one embodiment of CPU-line registers, in accordance with one embodiment of the present invention.

Referring now to FIG. 7, a block diagram for one embodiment of CPU-line registers 710 is shown, in accordance with one embodiment of the present invention. The FIG. 7 embodiment includes an internal CPU-line register 710(*a*) and an external CPU-line register 710(*b*). In alternate embodiments, CPU-line registers 710 may readily include various other elements in addition to, or instead of, those elements discussed in conjunction with the FIG. 7 embodiment. In the FIG. 7 embodiment, CPU-line registers 710 may be implemented as part of interrupt registers 416 of interrupt module 210, or may alternately be implemented in any other suitable manner that is electrically coupled to electronic system 110.

In the FIG. 7 embodiment, internal CPU-line register 710(*a*) may preferably be implemented as a 32-bit register that stores a series of 2-bit fields that each correspond to a particular internal interrupt source 134(*b*). For example, in the FIG. 7 embodiment, bit zero and bit one of internal CPU-line register 710(*a*) preferably identify an interrupt zero CPU line 714 for a corresponding internal interrupt source zero, while bit thirty and bit thirty-one of internal CPU-line register 710(*a*) preferably identify an interrupt CPU line 726 for a corresponding internal interrupt source fifteen.

The two-bit fields of internal CPU-line register 710(*a*) may preferably correspond to CPU-line values initially obtained from CPU-line field 518 of configuration register 510 (FIG. 5) as shown in foregoing Table II. In the FIG. 7 embodiment, the foregoing two-bits fields may each be associated with a different internal interrupt source 134(*b*) through configuration register 510, as shown in foregoing Table I.

Similarly, in the FIG. 7 embodiment, external CPU-line register 710(*b*) may preferably be implemented as a 32-bit register that stores a series of 2-bit fields that each correspond to a particular external interrupt source 134(*a*). For example, in the FIG. 7 embodiment, bit zero and bit one of external CPU-line register 710(*b*) preferably identify an interrupt zero CPU line 730 for a corresponding external interrupt source zero, while bit thirty and bit thirty-one of external CPU-line register 710(*b*) preferably identify an interrupt CPU line 742 for a corresponding external interrupt source fifteen.

The two-bit fields of external CPU-line register 710(*b*) may preferably correspond to CPU-line values initially obtained from CPU-line field 518 of configuration register 510 (FIG. 5) as shown in foregoing Table II. In the FIG. 7 embodiment, the foregoing two-bits fields may each be associated with a different external interrupt source 134(*a*) through configuration register 510, as shown in foregoing Table I.

Figure 8:
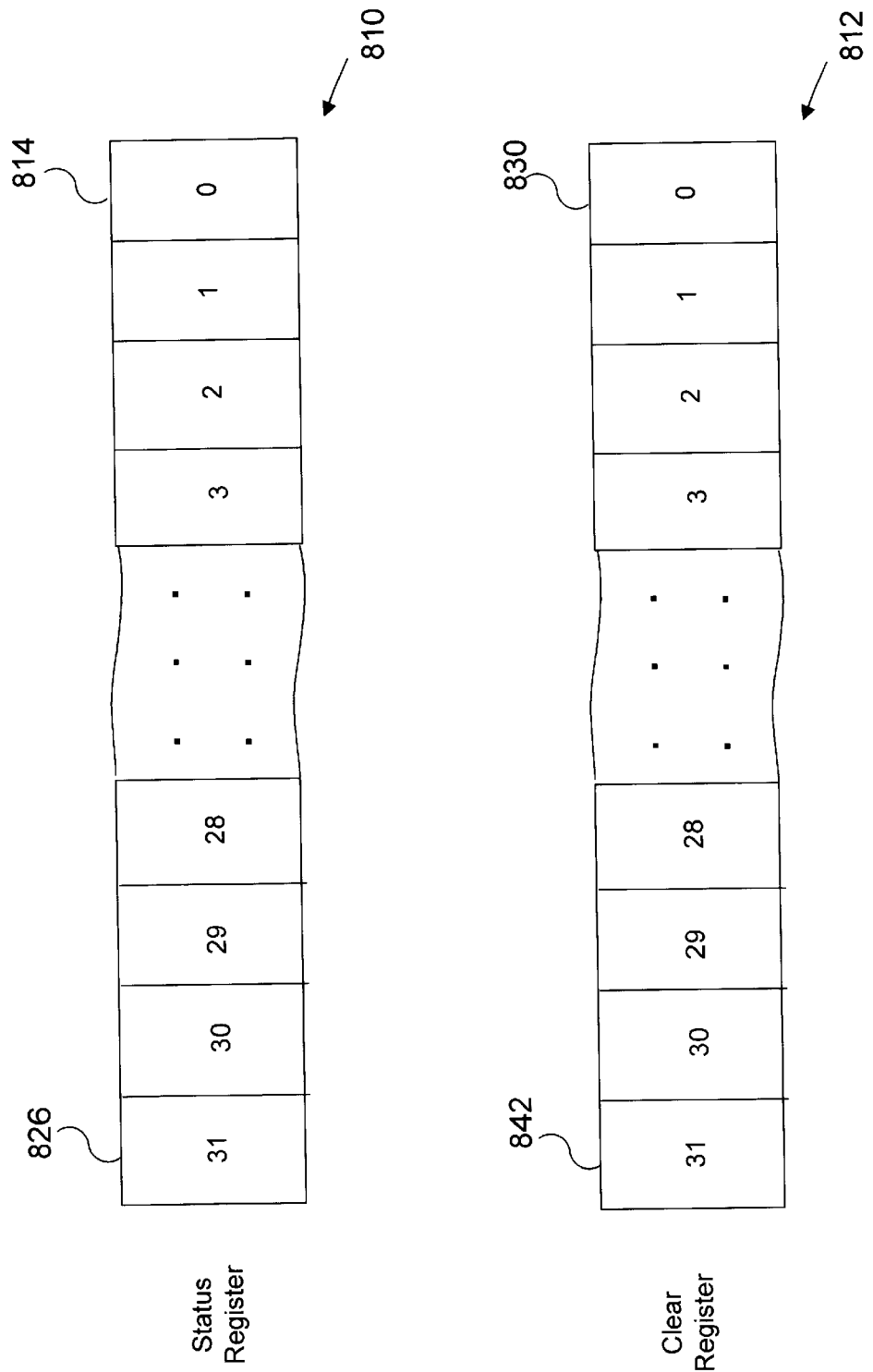
FIG. 8 includes block diagrams of a status register and a clear register, in accordance with one embodiment of the present invention.

Referring now to FIG. 8, block diagrams of a status register 810 and a clear register 812 are shown, in accordance with one embodiment of the present invention. In alternate embodiments, status register 810 and clear register 812 may readily include various other elements in addition to, or instead of, those elements discussed in conjunction with the FIG. 8 embodiment. In the FIG. 8 embodiment, status register 810 and clear register 812 may be implemented as part of interrupt registers 416 of interrupt module 210, or may alternately be implemented in any other suitable manner that is electrically coupled to electronic system 110.

In the FIG. 8 embodiment, each bit of either status register 810 or clear register 812 may preferably correspond to a different interrupt source 134, as shown in foregoing Table I. In accordance with the present invention, interrupt module 210 or another appropriate entity may preferably set a particular bit in status register 810 to thereby indicate that a corresponding interrupt source 134 has issued an interrupt to interrupt module 210. CPU 114 or any other interested entity may then poll status register 810 to learn which interrupt source 134 (or interrupt sources 134) may have issued a particular interrupt.

In the FIG. 8 embodiment, CPU 114 or any other appropriate entity may set a particular bit in clear register 812 to thereby indicate that an interrupt from a corresponding interrupt source 134 has been serviced by an appropriate interrupt handler 224. In certain embodiments, setting a particular bit in clear register 812 to indicate servicing of an interrupt for an interrupt source 134 may preferably reset a related bit in status register 810 that corresponds to the same interrupt and interrupt source 134.

Figure 9:
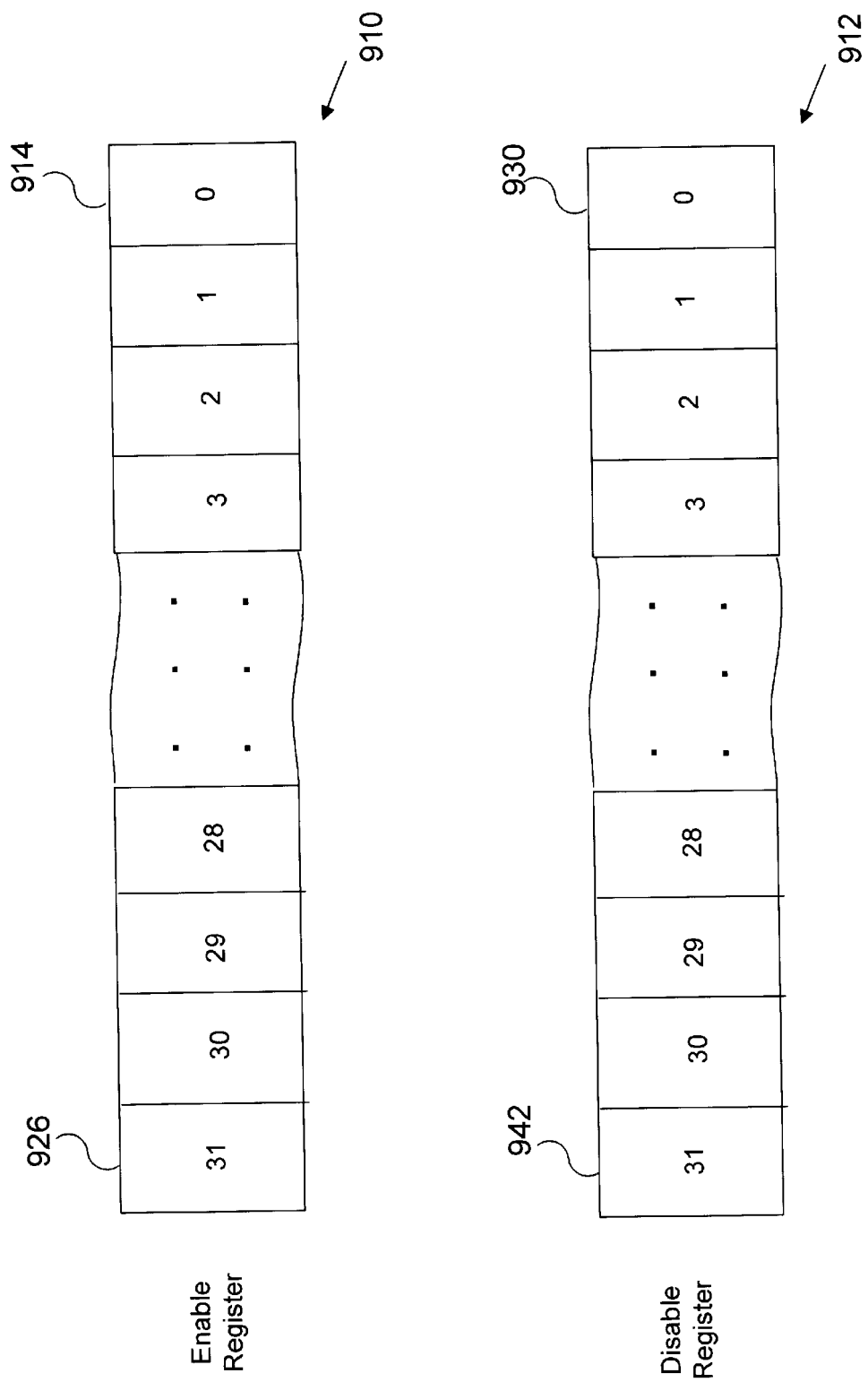
FIG. 9 includes block diagrams of an enable register and a disable register, in accordance with one embodiment of the present invention.

Referring now to FIG. 9, block diagrams of an enable register 910 and a disable register 912 are shown, in accordance with one embodiment of the present invention. In alternate embodiments, enable register 910 and disable register 912 may readily include various other elements in addition to, or instead of, those elements discussed in conjunction with the FIG. 9 embodiment. In the FIG. 9 embodiment, enable register 910 and disable register 912 may be implemented as part of interrupt registers 416 of interrupt module 210, or may alternately be implemented in any other suitable manner that is electrically coupled to electronic system 110.

In the FIG. 9 embodiment, each bit of either enable register 910 or disable register 912 may preferably correspond to a different interrupt source 134, as shown in foregoing Table I. In accordance with the present invention, CPU 114, initialization routine 220, operating system 216, interrupt module 210, or any other appropriate entity may preferably set a particular bit in enable register 910 to thereby indicate that a corresponding interrupt source 134 has been enabled to provide one or more interrupts to CPU 114. Interrupt module 210 or any other interested entity may then read enable register 910 to determine whether a particular interrupt source 134 has been enabled to provide one or more interrupts to CPU 114.

In the FIG. 9 embodiment, CPU 114, operating system 216, interrupt module 210, or any other appropriate entity may set a particular bit in disable register 912 to thereby indicate that a corresponding interrupt source 134 has been disabled for providing interrupts to CPU 114. Interrupt module 210 or any other interested entity may then read disable register 912 to determine whether a particular interrupt source 134 has been disabled for providing interrupts to CPU 114. In certain embodiments, setting a particular bit in disable register 912 to indicate that an interrupt source 134 is disabled may preferably reset a related bit in enable register 910 that corresponds to the same interrupt and interrupt source 134.

Figure 10:
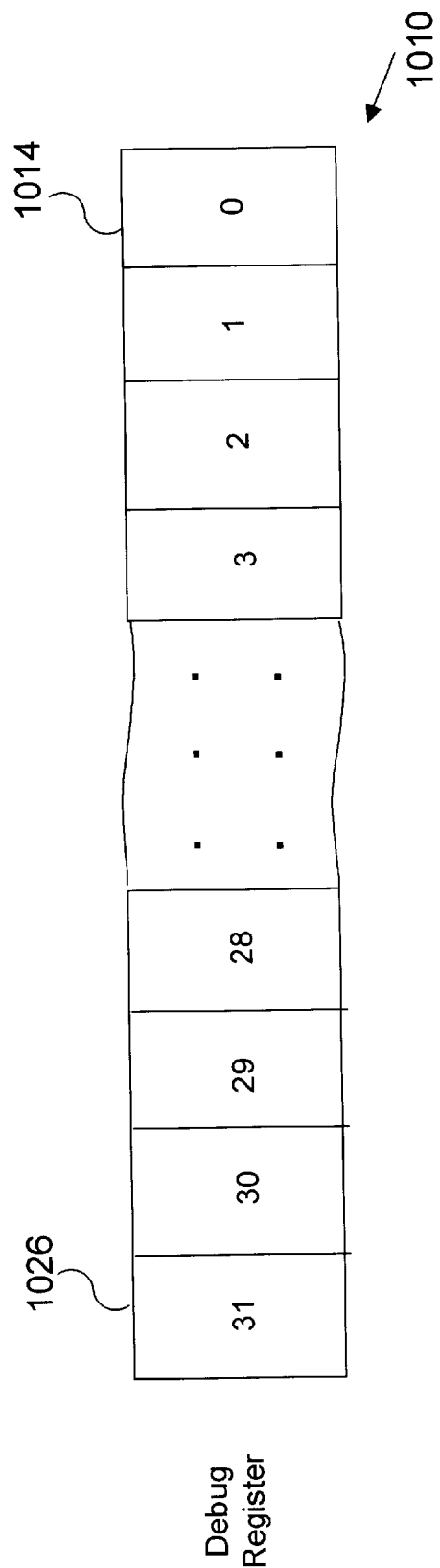
FIG. 10 is a block diagram of a debug register, in accordance with one embodiment of the present invention.

Referring now to FIG. 10, a block diagram of a debug register 1010 is shown, in accordance with one embodiment of the present invention. In alternate embodiments, debug register 1010 may readily include various other elements in addition to, or instead of, those elements discussed in conjunction with the FIG. 10 embodiment. In the FIG. 10 embodiment, debug register 1010 may be implemented as part of interrupt registers 416 of interrupt module 210, or may alternately be implemented in any other suitable manner that is electrically coupled to electronic system 110.

In the FIG. 10 embodiment, each bit of debug register 1010 may preferably correspond to a different interrupt source 134, as shown in foregoing Table I. In accordance with the present invention, one or more interrupt sources 134, operating system 216, interrupt module 210, or any other appropriate entity may preferably set a particular bit in debug register 1010 to thereby indicate that a corresponding interrupt source 134 has generated an error interrupt to interrupt module 210. CPU 114, interrupt module 210, or any other interested entity may then read debug register 1010 to thereby locate and potentially identify the reasons for the error interrupt from the associated interrupt module 210.

Figure 11:
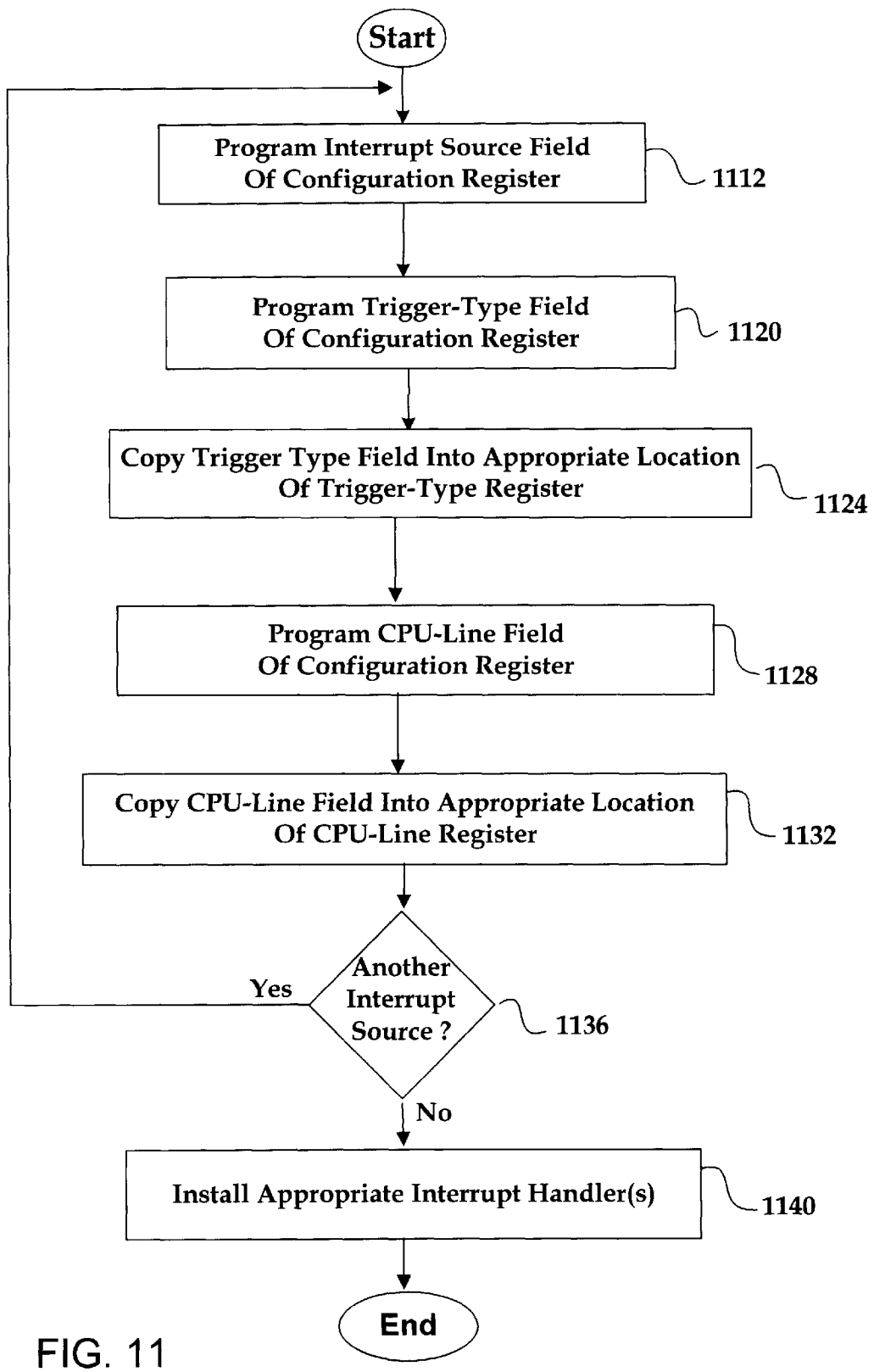
FIG. 11 is a flowchart of method steps for performing an interrupt configuration procedure, in accordance with one embodiment of the present invention.

Referring now to FIG. 11, a flowchart of method steps for performing an interrupt configuration procedure is shown, in accordance with one embodiment of the present invention. The FIG. 11 embodiment is presented for purposes of illustration, and in alternate embodiments, the present invention may readily utilize various steps and sequences other than those discussed in conjunction with the FIG. 11 embodiment. In addition, in various embodiments, certain steps of the FIG. 11 flowchart may occur in a substantially concurrent manner. For example, any of the following steps 1112 through 1132 may potentially be performed simultaneously by electronic system 110, in accordance with the present invention.

In the FIG. 11 embodiment, in step 1112, CPU 114, initialization routine 220, operating system 216, interrupt module 210, or any other appropriate entity may preferably program interrupt source field 514 of configuration register 510 to identify a particular interrupt source 134 in electronic system 110.

Next, in step 1120, CPU 114, initialization routine 220, operating system 216, interrupt module 210, or any other appropriate entity may preferably program trigger-type field 522 of configuration register 510 to select a particular trigger type for the foregoing interrupt source 134 of electronic system 110. In step 1124, interrupt module 210 or another appropriate entity may then preferably copy the trigger type field 522 from configuration register 510 into a corresponding location of trigger-type registers 610.

In step 1128, CPU 114, initialization routine 220, operating system 216, interrupt module 210, or any other appropriate entity may preferably program CPU-line field 518 of configuration register 510 to select a particular CPU line for the foregoing interrupt source 134 of electronic system 110. In step 1132, interrupt module 210 or another appropriate entity may then preferably copy the CPU-line field 518 from configuration register 510 into a corresponding location of CPU-line registers 710.

In step 1136, electronic system 110 may preferably determine whether the foregoing interrupt configuration procedure requires to be performed for any additional interrupts from interrupt sources 134. If the foregoing interrupt configuration procedure requires to be performed for any additional interrupt sources 134, then the FIG. 11 process may preferably return and repeat steps 1112 through 1136 until all interrupt sources 134 have been configured.

However, if all interrupts from all interrupt sources 134 have been configured, then in step 1140, CPU 114 may preferably install appropriate interrupt handlers 224 that correspond to the respective interrupt sources 134 of electronic system 110. The FIG. 11 process may then preferably terminate.

Figure 12:
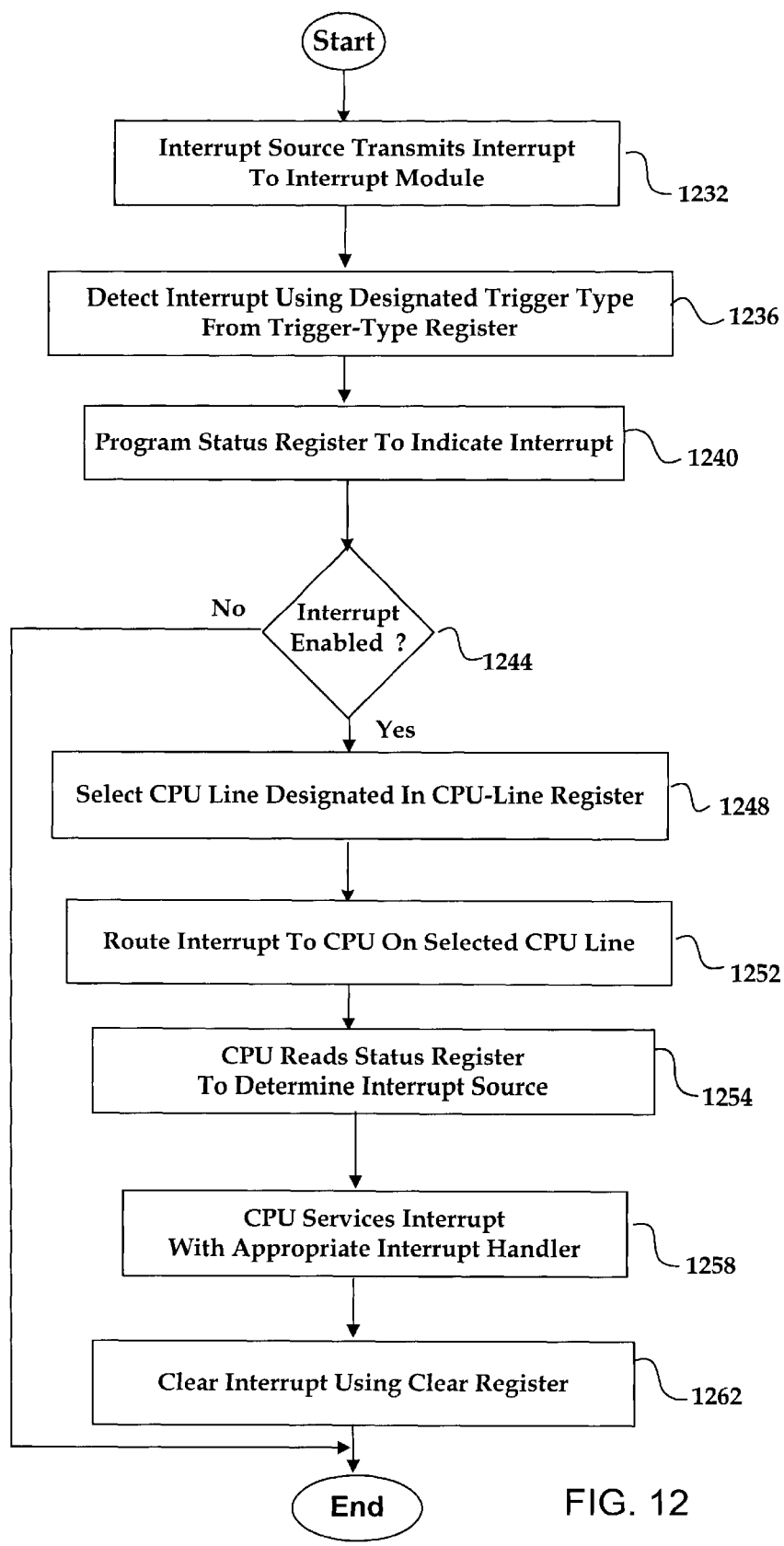
FIG. 12 is a flowchart of method steps for performing an interrupt servicing procedure, in accordance with one embodiment of the present invention.

Referring now to FIG. 12, a flowchart of method steps for performing an interrupt servicing procedure is shown, in accordance with one embodiment of the present invention. The FIG. 12 embodiment is presented for purposes of illustration, and in alternate embodiments, the present invention may readily utilize various steps and sequences other than those discussed in conjunction with the FIG. 12 embodiment.

In the FIG. 12 embodiment, in step 1232, a particular interrupt source 134 may preferably transmit an interrupt to interrupt module 210 of bridge device 118. In step 1236, trigger module 424 of interrupt module 210 may preferably detect the interrupt transmitted from interrupt source 134 by utilizing a trigger type designated in trigger-type registers 610.

In step 1240, interrupt controller 432 of interrupt module 210 may preferably program status register 810 of interrupt registers 416 to thereby indicate the occurrence of the interrupt from interrupt source 134. Then, in step 1244, interrupt module 210 may preferably determine whether the interrupt from interrupt source 134 has been enabled for servicing by utilizing any appropriate means. In the FIG. 12 embodiment, interrupt module 210 may preferably reference enable register 914 to determine whether the interrupt from interrupt source 134 has been enabled. If the interrupt from interrupt source 134 has not been enabled for servicing, then the FIG. 12 process may preferably terminate.

However, if the interrupt from interrupt source 134 has been enabled, then in step 1248, interrupt module 210 may preferably select an appropriate CPU line 112 that is designated in CPU-line register 710. In step 1252, interrupt controller 432 may then preferably route the interrupt received from interrupt source 134 to CPU 114 via the particular CPU line 112 that was selected in foregoing step 1248.

In step 1254, CPU 114 may preferably read an appropriate location in status register 810 to thereby determine the particular interrupt source 134 corresponding to the received interrupt. Then, in step 1258, CPU 114 may preferably utilize an appropriate corresponding interrupt handler 224 to service the interrupt from interrupt source 134. Finally, in step 1262, CPU 114, interrupt module 210, or other appropriate entity may preferably clear the interrupt in clear register 812, and thereby reset the corresponding location in status register 810 to indicate that the interrupt has been successfully serviced. The FIG. 12 process may then preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. An apparatus for managing an electronic system, comprising:
a processor coupled to said electronic system for selectively programming a configuration register with interrupt parameters for performing an interrupt configuration procedure, said interrupt parameters including a trigger-type parameter and a CPU-line parameter;
an interrupt source coupled to said electronic system for generating an interrupt for said electronic system;
an interrupt module configured to flexibly detect a trigger type of said interrupt in accordance with said trigger-type parameter accessed from a trigger-type register, said interrupt module responsively routing said interrupt to said processor in accordance with said CPU-line parameter accessed from a CPU-line register to thereby execute an interrupt servicing procedure, said trigger-type register including an internal trigger-type register containing a series of two-bit internal trigger-type values that each designate said trigger type for one of sixteen internal interrupt sources, said trigger-type register also including an external trigger-type register containing a series of two-bit external trigger-type values that each designate said trigger type for one of sixteen external interrupt sources.

2. The apparatus of claim 1 wherein said electronic system comprises said processor, one or more external interrupt sources, a memory device, and a bridge device that allows said processor, said one or more external interrupt sources, and said memory device to bi-directionally communicate.

3. The apparatus of claim 2 wherein said memory device includes application software, an operating system, an initialization routine for performing said interrupt configuration procedure, and an interrupt handler for servicing said interrupt.

4. The apparatus of claim 2 wherein said bridge device includes said interrupt module, one or more external interrupt source interfaces, and one or more internal interrupt sources.

5. The apparatus of claim 1 wherein a bypass interrupt source transmits a bypass interrupt directly to said processor without communicating through said interrupt module.

6. The apparatus of claim 1 wherein said interrupt module includes a trigger module for detecting said interrupt based upon said trigger-type parameter, an interrupt controller for coordinating functions of said interrupt module, interrupt registers that are programmed with said interrupt parameters during said interrupt configuration procedure, and a CPU-line switch for selecting a designated CPU line to said processor based upon said CPU-line parameter.

7. The apparatus of claim 6 wherein said interrupt module receives sixteen separate external input lines from sixteen of said external interrupt sources, said interrupt module also receiving sixteen separate internal input lines from sixteen of said internal interrupt sources.

8. The apparatus of claim 6 wherein said trigger module may detect said interrupt based upon any of a low-level trigger, a high-level trigger, a negative-edge trigger, and a positive-edge trigger.

9. The apparatus of claim 6 wherein said CPU-line switch may selectively route said interrupt to said processor using any one of a first CPU line, a second CPU line, a third CPU line, and a fourth CPU line.

10. The apparatus of claim 6 wherein said interrupt registers include said configuration register, an internal trigger-type register for internal interrupt sources, an external trigger-type register for external interrupt sources, an internal CPU-line register for internal interrupt sources, an external CPU-line register for external interrupt sources, a status register, a clear register, an enable register, a disable register, and a debug register.

11. The apparatus of claim 7 wherein said interrupt registers are implemented as 32-bit registers which contain a series of discrete locations that each correspond to one of an internal interrupt source and an external interrupt source.

12. The apparatus of claim 6 wherein said electronic system utilizes a write-only procedure to program said interrupt registers, said write-only procedure affecting only register values that change from a binary zero to a binary one to thereby conserve system resources by avoiding a conventional read-modify-write procedure.

13. The apparatus of claim 1 wherein said configuration register includes an interrupt source field to identify said interrupt source, a trigger-type field to designate a trigger type for detecting said interrupt, and a CPU-line field to designate a CPU line for routing said interrupt to said processor.

14. The apparatus of claim 13 wherein said interrupt source field is encoded as a five-bit binary value that can identify thirty-two separate interrupt sources, said trigger-type field being encoded as a first two-bit binary value that can identify four separate trigger types, said CPU-line field being encoded as a second two-bit binary value that can select from four separate CPU lines to said processor.

15. The apparatus of claim 1 wherein said interrupt module programs a status interrupt-source location in a status register after detecting said interrupt to enable said electronic system to poll said status register regarding said interrupt, said interrupt module programming a clear interrupt-source location in a clear register and also clearing said status interrupt-source location in said status register after servicing said interrupt.

16. The apparatus of claim 1 wherein said interrupt module programs an enable interrupt-source location in a enable register to thereby enable routing said interrupt to said processor, said interrupt module selectively programming a disable interrupt-source location in a disable register and also clearing said enable interrupt-source location in said enable register in response to pre-determined interrupt-disabling criteria in said electronic system.

17. The apparatus of claim 1 wherein said interrupt module includes a debug register that contains a series of debug locations that each may be separately programmed and analyzed in response to error conditions occurring in corresponding debug interrupt sources in said electronic system.

18. The apparatus of claim 1 wherein said processor programs an interrupt source field of said configuration register to identify said interrupt source from among a plurality of interrupt sources in said electronic system.

19. The apparatus of claim 18 wherein said processor programs a trigger-type field of said configuration register to designate said trigger-type parameter for detecting said interrupt with a trigger module from said interrupt module, said interrupt module responsively copying said trigger-type parameter from said configuration register into a corresponding location in said trigger-type register.

20. The apparatus of claim 19 wherein said processor programs a CPU-line field of said configuration register to designate said CPU-line parameter for routing said interrupt to said processor with a CPU-line switch from said interrupt module, said interrupt module responsively copying said CPU-line parameter from said configuration register into a corresponding location in said CPU-line register.

21. The apparatus of claim 20 wherein said processor installs an interrupt handler for performing said interrupt servicing procedure for servicing said interrupt from said interrupt source.

22. The apparatus of claim 1 wherein said interrupt source transmits said interrupt to said interrupt module in response to an interrupt event occurring in said electronic system, a trigger module in said interrupt module being configured during said interrupt configuration procedure to detect said trigger type of said interrupt, said trigger module responsively notifying an interrupt controller of said interrupt module after detecting said interrupt.

23. The apparatus of claim 22 wherein said interrupt module programs a dedicated interrupt-source status location in a status register to indicate detecting said interrupt from said interrupt source to thereby identify said interrupt source to any interested entity in said electronic system.

24. The apparatus of claim 23 wherein said interrupt module reads a dedicated interrupt-source enable location in an enable register to determine whether to route said interrupt to said processor.

25. The apparatus of claim 24 wherein said interrupt module selects a designated CPU line with a configurable CPU-line switch, and routes said interrupt to said processor over said designated CPU line whenever said dedicated interrupt-source enable location in said enable register indicates that said interrupt source has been enabled.

26. The apparatus of claim 25 wherein said processor reads said dedicated interrupt-source status location in said status register to thereby identify said interrupt source.

27. The apparatus of claim 26 wherein processor services said interrupt with said interrupt handler, and then programs a dedicated interrupt-source clear location in a clear register to indicate that said interrupt from said interrupt source has been serviced.

28. The apparatus of claim 1 wherein said interrupt configuration procedure is performed during one of a system initialization procedure at system powerup and a normal operation mode of said electronic system in response to one or more changes in operating conditions of said electronic system.

29. An apparatus for managing an electronic system, comprising:
  a processor coupled to said electronic system for selectively programming a configuration register with interrupt parameters for performing an interrupt configuration procedure, said interrupt parameters including a trigger-type parameter and a CPU-line parameter;
  an interrupt source coupled to said electronic system for generating an interrupt for said electronic system;
  an interrupt module configured to flexibly detect a trigger type of said interrupt in accordance with said trigger-type parameter accessed from a trigger-type register, said interrupt module responsively routing said interrupt to said processor in accordance with said CPU-line parameter accessed from a CPU-line register to thereby execute an interrupt servicing procedure, said CPU-line register including an internal CPU-line register containing a series of two-bit internal CPU-line values that each designate said CPU-line parameter for one of sixteen internal interrupt sources, said CPU-line register also including an external CPU-line register containing a series of two-bit external CPU-line values that each designate said CPU-line parameter for one of sixteen external interrupt sources.

30. A method for managing an electronic system, comprising the steps of:
  programming a configuration register with interrupt parameters for performing an interrupt configuration procedure by utilizing a processor coupled to said electronic system, said interrupt parameters including a trigger-type parameter and a CPU-line parameter;
  generating an interrupt from an interrupt source to an interrupt module coupled to said electronic system;
  detecting a trigger type of said interrupt in accordance with said trigger-type parameter accessed from a trigger-type register coupled to said interrupt module; and
  routing said interrupt to said processor in accordance with said CPU-line parameter accessed from a CPU-line register to thereby execute an interrupt servicing procedure, said CPU-line register including an internal CPU-line register containing a series of two-bit internal CPU-line values that each designate said CPU-line parameter for one of sixteen internal interrupt sources, said CPU-line register also including an external CPU-line register containing a series of two-bit external CPU-line values that each designate said CPU-line parameter for one of sixteen external interrupt sources.

31. The method of claim 30 wherein said electronic system comprises said processor, one or more external interrupt sources, a memory device, and a bridge device that allows said processor, said one or more external interrupt sources, and said memory device to bi-directionally communicate.

32. The method of claim 31 wherein said memory device includes application software, an operating system, an initialization routine for performing said interrupt configuration procedure, and an interrupt handler for servicing said interrupt.

33. The method of claim 31 wherein said bridge device includes said interrupt module, one or more external interrupt source interfaces, and one or more internal interrupt sources.

34. The method of claim 30 wherein a bypass interrupt source transmits a bypass interrupt directly to said processor without communicating through said interrupt module.

35. The method of claim 30 wherein said interrupt module includes a trigger module for detecting said interrupt based upon said trigger-type parameter, an interrupt controller for coordinating functions of said interrupt module, interrupt registers that are programmed with said interrupt parameters during said interrupt configuration procedure, and a CPU-line switch for selecting a designated CPU line to said processor based upon said CPU-line parameter.

36. The method of claim 35 wherein said interrupt module receives sixteen separate external input lines from sixteen of said external interrupt sources, said interrupt module also receiving sixteen separate internal input lines from sixteen of said internal interrupt sources.

37. The method of claim 35 wherein said trigger module may detect said interrupt based upon any of a low-level trigger, a high-level trigger, a negative-edge trigger, and a positive-edge trigger.

38. The method of claim 35 wherein said CPU-line switch may selectively route said interrupt to said processor using any one of a first CPU line, a second CPU line, a third CPU line, and a fourth CPU line.

39. The method of claim 35 wherein said interrupt registers include said configuration register, an internal trigger-type register for internal interrupt sources, an external trigger-type register for external interrupt sources, an internal CPU-line register for internal interrupt sources, an external CPU-line register for external interrupt sources, a status register, a clear register, an enable register, a disable register, and a debug register.

40. The method of claim 36 wherein said interrupt registers are implemented as 32-bit registers which contain a series of discrete locations that each correspond to one of an internal interrupt source and an external interrupt source.

41. The method of claim 35 wherein said electronic system utilizes a write-only procedure to program said interrupt registers, said write-only procedure affecting only register values that change from a binary zero to a binary one to thereby conserve system resources by avoiding a conventional read-modify-write procedure.

42. The method of claim 30 wherein said configuration register includes an interrupt source field to identify said interrupt source, a trigger-type field to designate a trigger type for detecting said interrupt, and a CPU-line field to designate a CPU line for routing said interrupt to said processor.

43. The method of claim 42 wherein said interrupt source field is encoded as a five-bit binary value that can identify thirty-two separate interrupt sources, said trigger-type field being encoded as a first two-bit binary value that can identify four separate trigger types, said CPU-line field being encoded as a second two-bit binary value that can select from four separate CPU lines to said processor.

44. The method of claim 30 wherein said interrupt module programs a status interrupt-source location in a status register after detecting said interrupt to enable said electronic system to poll said status register regarding said interrupt, said interrupt module programming a clear interrupt-source location in a clear register and also clearing said status interrupt-source location in said status register after servicing said interrupt.

45. The method of claim 30 wherein said interrupt module programs an enable interrupt-source location in a enable register to thereby enable routing said interrupt to said processor, said interrupt module selectively programming a disable interrupt-source location in a disable register and also clearing said enable interrupt-source location in said enable register in response to pre-determined interrupt-disabling criteria in said electronic system.

46. The method of claim 30 wherein said interrupt module includes a debug register that contains a series of debug locations that each may be separately programmed and analyzed in response to error conditions occurring in corresponding debug interrupt sources in said electronic system.

47. The method of claim 30 wherein said processor programs an interrupt source field of said configuration register to identify said interrupt source from among a plurality of interrupt sources in said electronic system.

48. The method of claim 47 wherein said processor programs a trigger-type field of said configuration register to designate said trigger-type parameter for detecting said interrupt with a trigger module from said interrupt module, said interrupt module responsively copying said trigger-type parameter from said configuration register into a corresponding location in said trigger-type register.

49. The method of claim 48 wherein said processor programs a CPU-line field of said configuration register to designate said CPU-line parameter for routing said interrupt to said processor with a CPU-line switch from said interrupt module, said interrupt module responsively copying said CPU-line parameter from said configuration register into a corresponding location in said CPU-line register.

50. The method of claim 49 wherein said processor installs an interrupt handler for performing said interrupt servicing procedure for servicing said interrupt from said interrupt source.

51. The method of claim 30 wherein said interrupt source transmits said interrupt to said interrupt module in response to an interrupt event occurring in said electronic system, a trigger module in said interrupt module being configured during said interrupt configuration procedure to detect said trigger type of said interrupt, said trigger module responsively notifying an interrupt controller of said interrupt module after detecting said interrupt.

52. The method of claim 51 wherein said interrupt module programs a dedicated interrupt-source status location in a status register to indicate detecting said interrupt from said interrupt source to thereby identify said interrupt source to any interested entity in said electronic system.

53. The method of claim 52 wherein said interrupt module reads a dedicated interrupt-source enable location in an enable register to determine whether to route said interrupt to said processor.

54. The method of claim 53 wherein said interrupt module selects a designated CPU line with a configurable CPU-line switch, and routes said interrupt to said processor over said designated CPU line whenever said dedicated interrupt-source enable location in said enable register indicates that said interrupt source has been enabled.

55. The method of claim 54 wherein said processor reads said dedicated interrupt-source status location in said status register to thereby identify said interrupt source.

56. The method of claim 55 wherein processor services said interrupt with said interrupt handler, and then programs a dedicated interrupt-source clear location in a clear register to indicate that said interrupt from said interrupt source has been serviced.

57. The method of claim 30 wherein said interrupt configuration procedure is performed during one of a system initialization procedure at system powerup and a normal operation mode of said electronic system in response to one or more changes in operating conditions of said electronic system.

58. The method of claim 30 wherein said electronic system is implemented as part of one of an integrated circuit device, an audio/visual electronic system, a consumer electronics device, a portable electronic device, and a computer system.

59. A method for managing an electronic system, comprising the steps of:

programming a configuration register with interrupt parameters for performing an interrupt configuration procedure by utilizing a processor coupled to said electronic system, said interrupt parameters including a trigger-type parameter and a CPU-line parameter;

generating an interrupt from an interrupt source to an interrupt module coupled to said electronic system;

detecting a trigger type of said interrupt in accordance with said trigger-type parameter accessed from a trigger-type register coupled to said interrupt module; and routing said interrupt to said processor in accordance with said CPU-line parameter accessed from a CPU-line register to thereby execute an interrupt servicing procedure, said trigger-type register including an internal trigger-type register containing a series of two-bit internal trigger-type values that each designate said trigger type for one of sixteen internal interrupt sources, said trigger-type register also including an external trigger-type register containing a series of two-bit external trigger-type values that each designate said trigger type for one of sixteen external interrupt sources.

60. A computer readable medium comprising program instructions for managing an electronic system by performing the steps of:

programming a configuration register with interrupt parameters for performing an interrupt configuration procedure by utilizing a processor coupled to said electronic system said interrupt parameters including a trigger-type parameter and a CPU-line parameter;

generating an interrupt from an interrupt source to an interrupt module coupled to said electronic system;

detecting a trigger type of said interrupt in accordance with said trigger-type parameter accessed from a trigger-type register coupled to said interrupt module; and routing said interrupt to said processor in accordance with said CPU-line parameter accessed from a CPU-line register to thereby execute an interrupt servicing procedure, said trigger-type register including an internal trigger-type register containing a series of two-bit internal trigger-type values that each designate said trigger type for one of sixteen internal interrupt sources, said trigger-type register also including an external trigger-type register containing a series of two-bit external trigger-type values that each designate said trigger type for one of sixteen external interrupt sources.

61. An apparatus for managing an electronic system, comprising:

means for programming a configuration register with interrupt parameters for performing an interrupt configuration procedure, said interrupt parameters including a trigger-type parameter and a CPU-line parameter;

means for generating an interrupt to an interrupt module coupled to said electronic system;

means for detecting a trigger type of said interrupt in accordance with said trigger-type parameter accessed from a trigger-type register coupled to said interrupt module; and means for routing said interrupt to said processor in accordance with said CPU-line parameter accessed from a CPU-line register to thereby execute an interrupt servicing procedure, said CPU-line register including an internal CPU-line register containing a series of two-bit internal CPU-line values that each designate said CPU-line parameter for one of sixteen internal interrupt sources, said CPU-line register also including an external CPU-line register containing a series of two-bit external CPU-line values that each designate said CPU-line parameter for one of sixteen external interrupt sources.

62. A method for performing an interrupt configuration procedure for an electronic system, comprising the steps of:

programming an interrupt source field of a configuration register with a processor to identify interrupt sources in said electronic system, said interrupt sources including at least one of an internal interrupt source and an external interrupt source;

programming a trigger-type field of said configuration register with said processor to identify trigger types for said interrupt sources in said electronic system;

copying said trigger-type field into dedicated trigger-type locations in one of an internal trigger-type register and an external trigger-type register;

programming a CPU-line field of said configuration register with said processor to identify CPU-lines for routing interrupts from said interrupt sources to said processor;

copying said CPU-line field into dedicated CPU-line locations in one of an internal CPU-line register and an external CPU-line register;

installing interrupt handlers corresponding to said interrupt sources; and servicing said interrupts by utilizing said interrupt handlers.

63. A method for performing an interrupt servicing procedure for an electronic system, comprising the steps of:

performing an interrupt configuration procedure for said electronic system;

transmitting interrupts from interrupt sources to an interrupt module coupled to said electronic system, said interrupt sources including at least one of an internal interrupt source and an external interrupt source;

detecting said interrupts with a trigger module by utilizing designated trigger types from a trigger type register;

programming a status register to indicate that said interrupts from said interrupt sources have been detected by said interrupt module;

selecting designated CPU lines with a CPU-line switch based upon CPU line fields in CPU-line registers;

determining whether said interrupt sources have been enabled for servicing by said electronic system;

routing said interrupts to a processor over said CPU lines when said interrupt sources have been enabled for servicing;

reading said status register with said processor to identify said interrupt sources corresponding to said interrupts;

servicing said interrupts with corresponding interrupt handlers; and programming a clear register to indicate that said interrupts have been serviced, said CPU-line register including an internal CPU-line register containing a series of two-bit internal CPU-line values that each designate said CPU-line parameter for one of sixteen internal interrupt sources, said CPU-line register also including an external CPU-line register containing a series of two-bit external CPU-line values that each designate said CPU-line parameter for one of sixteen external interrupt sources.

* * * * *